Patented Mar. 11, 1952

2,589,205

UNITED STATES PATENT OFFICE 2,589,205

1-BENZYLPIPERIDINE COMPOUNDS

Albert Pohland, Indianapolis, Ind., assignor to Eli Lilly and Company, Indianapolis, Ind., a corporation of Indiana No Drawing. Application October 12, 1949, Serial No. 121,068

8 Claims. (Cl. 260—293.4)

This invention relates to novel organic chemical compounds and their preparation and more particularly to substituted 1-benzylpiperidine bases and their acid addition salts.

The substituted 1-benzylpiperidine bases of the present invention are represented by the following formula

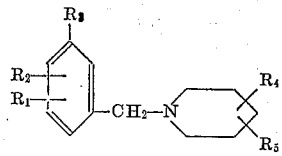

in which $R_1$ and $R_2$ are members of the group consisting of —H, —OH, —Z, —OZ, and —SZ, wherein Z is an aliphatic hydrocarbon radical having from 1 to 8 carbon atoms; $R_3$ is a member of the group consisting of —OH, —Z, —OZ, and —SZ, wherein Z has the same significance as before; $R_4$ is a lower alkyl radical; and $R_5$ is hydrogen or a lower alkyl radical. By the term —OZ is meant an oxygen-linked aliphatic hydrocarbon radical, and by the term —SZ is meant a sulfur-linked aliphatic hydrocarbon radical.

The novel compounds and their acid addition salts have utility as oxytocics, that is they exert an action on uterine muscle comparable in nature to that of ergot.

The compounds of this invention are prepared by means of the several condensation methods described below. In the description and formulas to follow, $R_1$, $R_2$, $R_3$, $R_4$ and $R_5$ have the same significance as used hereinabove, and X represents a halogen such as chlorine, bromine or iodine.

*Method A.*—A benzyl halide having the desired $R_1$, $R_2$ and $R_3$ substituents is condensed with a

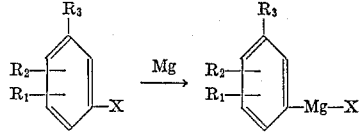

piperidine substituted with $R_4$ and $R_5$ as substituents, by heating the reactants in solution in an inert water-immiscible solvent. The condensation which takes place to form the substituted 1-benzylpiperidine in the form of its hydrohalide salt is illustrated by the following equation:

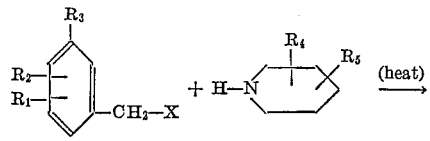

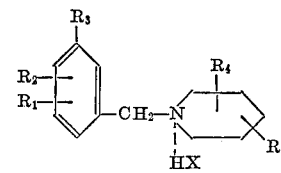

The acid addition salt of the substituted 1-benzylpiperidine formed in the reaction is isolated by extracting it from the reaction mixture with dilute acid. The aqueous extract is neutralized with an alkali and the substituted 1-benzylpiperidine base is extracted from the aqueous mixture with ether, and recovered and purified by fractional distillation of the ethereal extract.

*Method B.*—A Grignard reagent is prepared from magnesium and a halobenzene having the desired $R_1$, $R_2$ and $R_3$ substituents. This reagent is then reacted in ether solution with an N-ether derivative of piperidine which is substituted with any of the radicals represented by $R_4$ and $R_5$. The reaction mixture is poured over a mixture of ice and mineral acid and the substituted 1-benzylpiperidine formed in the reaction and contained in aqueous phase in the form of its mineral acid salt is isolated by the addition of alkali, extraction with ether and fractional distillation of the ether extract. The reaction is illustrated by the following equation:

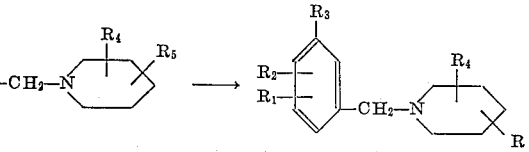

*Method C.*—One equivalent of a suitably substituted benzoyl halide is reacted with two equivalents of a substituted piperidine in solution in an inert solvent to produce a 1-benzoylpiperidine compound. The halide salt of the substituted piperidine and the solvent are removed from the reaction mixture by washing and evaporation, and the residue of the 1-benzoylpiperidine compound is dissolved in anhydrous ether and treated with lithium aluminum hydride to reduce the keto group of the 1-benzoylpiperidine compound to a methylene group. The reaction mixture is treated with water to destroy excess lithium aluminum hydride and extracted with dilute acid, thereby obtaining an acid aqueous solution of the substituted 1-benzylpiperidine. The substituted 1-benzylpiperidine base is recovered from the aqueous acid solution by the addition of alkali, extraction with a water-immiscible solvent and fractional distillation of the ether extract. The reactions involved in the synthesis are illustrated by the following equation:

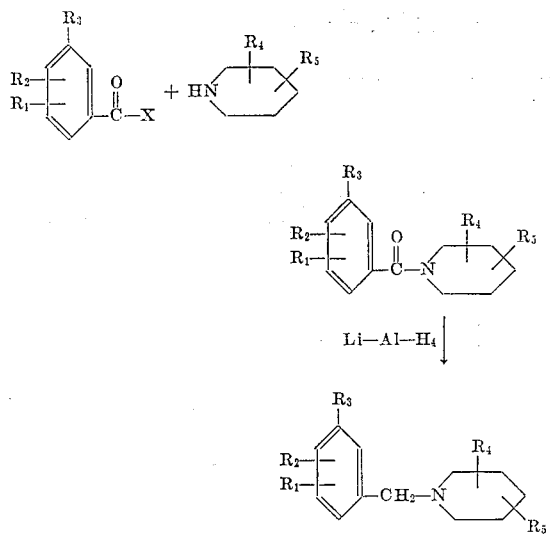

*Method D.*—A hydroxybenzene substituted with the desired substituents, is reacted with a suitably substituted piperidine in the presence of formaldehyde, in an inert solvent, to produce a substituted 1-benzylpiperidine. The solvent is distilled from the reaction mixture and the substituted 1-benzylpiperidine base is recovered by fractional distillation. The condensation reaction is represented by the following equation:

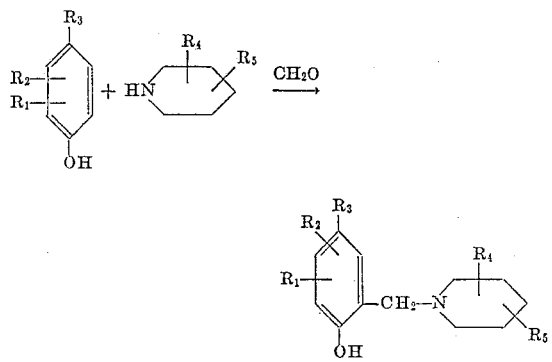

The salts of the substituted 1-benzylpiperidine bases of this invention are prepared from the bases by methods well known to the art for the conversion of nitrogen bases into their salts. Thus, stoichiometric quantities of base and the desired acid, such as for example, hydrochloric, hydrobromic, sulfuric, nitric, acetic, citric, phosphoric, maleic acid and the like, are reacted in solution, for example anhydrous ethanol solution, and the resulting mixture evaporated to dryness yielding the salt as a solid material. Alternatively, instead of evaporating the solution to recover the salt, it may be precipitated from solution by the addition thereto of a miscible solvent in which the salt is insoluble, for example, anhydrous ether. Additionally, stoichiometric amounts of the base and the acid are reacted in aqueous mixture, and the aqueous solution containing the acid addition salt is evaporated to dryness to isolate the solid salt.

The substituted benzene derivatives and the piperidine derivatives which are employed as intermediates in synthesis of the substituted 1-benzylpiperidines of this invention are obtained from the usual commercial sources or are obtained by commonly employed chemical methods.

The following substituted 1-benzylpiperidine bases which can be prepared by the methods set out above serve to illustrate this invention:

(1) 1 - (2-ethyl-4,5-diethoxybenzyl) -2-methylpiperidine (2) 1 - (2 - isopropyloxy - 3-methyl-5-hydroxybenzyl) -2-methylpiperidine (3) 1 - (2-n-amyl-5-hydroxybenzyl) -2-methylpiperidine (4) 1-(2-hydroxy-4,5-diethylbenzyl) -2-methylpiperidine (5) 1 - (3,4,5-trihydroxybenzyl) -2-methylpiperidine (6) 1 - (2-isopropylmercapto-5-methylbenzyl) - 2-methylpiperidine (7) 1 - (2-methyl-5-isopropylmercaptobenzyl) - 2-methylpiperidine (8) 1-(3,4-dimethylmercaptobenzyl) -2-methylpiperidine (9) 1 - (3 - n-amyl-5-ethoxybenzyl) -2-methylpiperidine

(10) 1 - (3 - hydroxy - 5 - n - propylbenzyl) -2-methylpiperidine

(11) 1 - (3 - ethyl - 5 - ethylmercaptobenzyl) -2-methylpiperidine

(12) 1-(3-n-propyl-5-n-propylmercaptobenzyl) - 2-methylpiperidine

(13) 1 - (3 - hydroxy - 5-hexylbenzyl) -2-methylpiperidine

(14) 1 - (2 - hexyl-5-methylmercaptobenzyl) -2-methylpiperidine

(15) 1 - (2 - ethoxy-5-n-amylbenzyl) -2-methylpiperidine

(16) 1 - (2 - methylmercapto-5-hydroxybenzyl) - 2-methylpiperidine

(17) 1 - (2 - n-heptylmercapto-5-methylbenzyl) - 2-methylpiperidine

(18) 1 - (4 - n - heptyl - 3-hydroxybenzyl) -2-methylpiperidine

(19) 1 - (4-isopropylmercapto-3-n-amylbenzyl) - 2-methylpiperidine

(20) 1 - (2 - n - propyloxy - 5-methylbenzyl) -4-methylpiperidine

(21) 1 - (2 - n-amyl-5-hydroxy) -3-methylpiperidine

(22) 1 - (2 - hydroxy - 3,5 - dimethylbenzyl) - 4-methylpiperidine

(23) 1 - (2,4,5 - trimethylbenzyl) -4-methylpiperidine

(24) 1 - (2 - n-octyl-5-hydroxybenzyl) -4-ethylpiperidine

(25) 1 - (2-isopropylmercapto-5-methylbenzyl) - 4-methylpiperidine

(26) 1 - (2 - butenyloxy - 5-methylbenzyl) -4-n-propylpiperidine

(27) 1-(3-hydroxy-5-n-propylbenzyl) -4-methylpiperidine

(28) 1 - (2-methyl-5-isopropylmercaptobenzyl) - 3-ethylpiperidine
(29) 1 - (3,4 - dimethylmercaptobenzyl) - 4-isopropylpiperidine
(30) 1 - (3-n-amyl-5-ethoxybenzyl) -4-n-propylpiperidine
(31) 1 - (3 - ethyl - 5 - ethylmercaptobenzyl) -4-ethylpiperidine
(32) 1-(3-n-propyl-5-n-propylmercaptobenzyl) - 3-isopropylpiperidine
(33) 1 - (3 - hydroxy - 5 - n-hexylbenzyl) -3-isopropylpiperidine
(34) 1 - (2-n-hexyl-5-methylmercaptobenzyl) -4-n-butylpiperidine
(35) 1 - (2-hydroxy-5-n-amylbenzyl) -4-n-butylpiperidine
(36) 1 - (2 - methylmercapto-5-hydroxybenzyl) - 3-n-butylpiperidine
(37) 1 - (2 - allyl-3-hydroxy-5-methoxybenzyl) -2-ethylpiperidine
(38) 1 - (2-n-heptylmercapto-5-methylbenzyl) - 3-n-butylpiperidine
(39) 1 - (4-hydroxy-3-methylbenzyl) -3-n-amylpiperidine
(40) 1 - (4-isopropylmercapto-5-n-amylbenzyl) - 2-ethylpiperidine
(41) 1 - (2 - isopropyloxy - 3 - methyl-5-ethoxybenzyl) -2-methylpiperidine
(42) 1 - (2 - ethyl - 5 - ethoxybenzyl) -2-methylpiperidine
(43) 1 - (2 - sec. - butyl - 5 - hydroxybenzyl) -2-methylpiperidine
(44) 1 - (2-isoamyl-5-methoxybenzyl) -2-methylpiperidine
(45) 1 - (2 - n - heptyloxy - 5-methylbenzyl) -3-methylpiperidine
(46) 1 - [2-(2-methylhexyl) -5-hydroxybenzyl] -2-methylpiperidine
(47) 1 - [2-hydroxy-5-(2-methylheptyl) benzyl] -2-methylpiperidine
(48) 1 - (4-n-heptyl-3-hydroxybenzyl) -2-ethylpiperidine
(49) 1 - (3,4,5 - trihydroxybenzyl) -2,6-dimethylpiperidine
(50) 1 - (2,4,5 - trimethylbenzyl) -2,4-dimethylpiperidine
(51) 1 - (2-n-octyl-5-hydroxybenzyl) -2-ethyl-4-methylpiperidine
(52) 1 - (2-isopropylmercapto-5-methylbenzyl) - 4-isopropylpiperidine
(53) 1 - (4-crotyl-5-methylbenzyl) -2,6-diethylpiperidine
(54) 1 - (2-methyl-5-isopropylmercaptobenzyl) - 2,6-dimethylpiperidine
(55) 1-(3,4-dimethylmercaptobenzyl) -4-methylpiperidine
(56) 1 - (2 - n-hexyl-5-methylmercaptobenzyl) - 2-methylpiperidine
(57) 1 - (2 - ethoxy - 5-n-amylbenzyl) -4-ethylpiperidine
(58) 1 - (2 - methylmercapto-5-hydroxybenzyl) - 2,4-dimethylpiperidine
(59) 1 - (2-n-heptylmercapto-5-methylbenzyl) - 2,6-dimethylpiperidine
(60) 1 - (4 - n - heptyl - 3-hydroxybenzyl) -2-n-butyl-6-ethylpiperidine
(61) 1 - (4 - hydroxy-3-methylbenzyl) -2-ethylpiperidine
(62) 1 - (4-isopropylmercapto-5-n-amylbenzyl) - 2,6-dimethylpiperidine
(63) 1 - (2 - isopropoxy - 3 - methyl - 5-ethoxybenzyl) -2,3-dimethylpiperidine
(64) 1 - (2-ethyl-5-ethoxybenzyl) -2-ethylpiperidine

(65) 1 - (2 - sec.-butyl-5-hydroxybenzyl) -4-isopropylpiperidine
(66) 1 - (2 - isoamyl-5-methoxybenzyl) -4-ethylpiperidine
(67) 1 - (2-n-heptyloxy-5-methylbenzyl) -2,6-dimethylpiperidine
(68) 1 - [2 - (2-methylhexyl) -5-hydroxybenzyl]-2,4-dimethylpiperidine
(69) 1 - [2-methyl-5-(2-methylhexyl) benzyl]-2-ethylpiperidine
(70) 1 - (2-isopropylmercapto-5-methylbenzyl) - 2,6-dimethylpiperidine
(71) 1 - (3 - hydroxy-5-n-propylbenzyl) -2,4-dimethylpiperidine
(72) 1 - (3,4 - dimethylmercaptobenzyl) -2,6-dimethylpiperidine
(73) 1 - (3-n-amyl-5-ethoxybenzyl) -2,6-diethylpiperidine
(74) 1 - (2-n-hexyl-5-methylmercaptobenzyl) -4-ethylpiperidine
(75) 1 - (2 - ethoxy - 5 - n-amylbenzyl) -2,4-dimethylpiperidine
(76) 1 - (4 - hydroxy - 5 - methylbenzyl) -4-isopropylpiperidine
(77) 1-(3-n-propyl-5-n-propylmercaptobenzyl) - 2-n-butylpiperidine
(78) 1 - (3 - hydroxy - 5-n-hexylbenzyl) -2,6-dimethylpiperidine The following specific examples illustrate more fully the preparation and characteristics of novel and useful compounds on this invention.

EXAMPLE 1

*Preparation of 1-(2-methoxy-5-methylbenzyl) - 2-methylpiperidine*

A mixture of 30 g. of 2-methoxy-5-methylbenzyl chloride, 35 g. of 2-methylpiperidine, and 150 cc. of benzene are refluxed for 2 hours. The reaction mixture is then extracted with three 100 cc. portions of 5 percent hydrochloric acid. The acid extracts are combined, and made basic with 10 percent sodium hydroxide solution, whereupon an oil comprising 1-(2-methoxy-5-methylbenzyl) -2-methylpiperidine base separates. The oily base is extracted with three 100 cc. portions of ethyl ether, and the ether extracts are combined, washed with water, and dried over anhydrous magnesium sulfate. The dried ether solution is evaporated in vacuo to remove the ether, and the residue is fractionally distilled under reduced pressure.

1-(2-methoxy - 5 - methylbenzyl) - 2- methylpiperidine thus obtained was a clear oil having a refractive index of $n_D^{26.5°}$ 1.5250, and boiling at 123–125° C. at 0.6 mm. of mercury. Analysis showed the presence of 6.29 percent of nitrogen as compared with the calculated amount of 6.00 percent.

EXAMPLE 2

*Preparation of 1-(2-methylmercapto-5-methylbenzyl) -2-methylpiperidine*

1-(2-methylmercapto - 5 - methylbenzyl) - 2 - methylpiperidine is prepared according to the method of Example 1, except that 37.3 g. of 2-methylmercapto-5-methylbenzyl chloride and 40 g. of 2-methylpiperidine are used.

1-(2-methylmercapto - 5 - methylbenzyl) - 2 - methylpiperidine base thus prepared boiled at 127–128° C. at 0.1 mm. The refractive index was $n_D^{25°}$ 1.5602. Analysis showed the presence of 5.87 percent nitrogen as compared with the calculated amount of 5.62 percent.

1-(2-methylmercapto - 5 - methylbenzyl) - 2 - methylpiperidine hydrobromide is obtained by treating a cold ether solution of 1-(2-methylmercapto - 5 - methylbenzyl) - 2 - methylpiperidine with gaseous hydrogen bromide. The hydrobromide salt which precipitated was purified by recrystallization from a mixture of methanol and ethyl acetate. It melted at about 135–136° C.

EXAMPLE 3

*Preparation of 1-(2-methoxy-5-ethylbenzyl)-2-methylpiperidine*

1-(2-methoxy - 5 - ethylbenzyl) - 2 - methylpiperidine is prepared according to the method set forth in Example 1, except that 18.5 g. of 2-methoxy-5-ethylbenzyl chloride and 19.8 g. of 2-methylpiperidine are used.

1-(2-methoxy - 5 - ethylbenzyl) - 2 - methylpiperidine base thus prepared boiled at 116–117° C. at 0.25 mm. The refractive index was $n_D^{25°}$ 1.5212. Analysis showed the presence of 5.65 percent of nitrogen as compared with the calculated amount of 5.66 percent.

2-methoxy-5-ethylbenzyl chloride used in this example is obtained by chloromethylating 4-ethylanisole with formalin and hydrogen chloride at about 50° C. 2-methoxy-5-ethylbenzyl chloride boils at 89–90° C. at a pressure of 0.6 mm. of mercury.

EXAMPLE 4

*Preparation of 1-(2-n-propoxy-5-methylbenzyl)-2-methylpiperidine*

1-(2-n-propoxy-5-methylbenzyl) - 2 - methylpiperidine is prepared according to the method set out in Example 1, except that 19.8 g. of 2-n-propoxy-5-methylbenzyl chloride and 20 g. of 2-methylpiperidine are used.

1-(2-n-propoxy-5-methylbenzyl) - 2 - methylpiperidine base thus prepared boiled at 119–121° C. at 0.3 mm. The refractive index was $n_D^{25°}$ 1.5146. Analysis showed the presence of 5.37 percent of nitrogen as compared with the calculated amount of 5.36 percent.

2-n-propoxy - 5 - methylbenzyl chloride (B. P. 91–93° C./6 mm. Hg) is obtained by the chloromethylation of p-cresyl-n-propyl ether.

1-(2-n-propoxy-5-methylbenzyl) - 2 - methylpiperidine hydrochloride is prepared by the procedure of Example 2 for the preparation of the hydrobromide salt, except that dry hydrogen chloride gas is used.

EXAMPLE 5

*Preparation of 1 - (3,4,5 - trimethoxybenzyl)-2-methylpiperidine*

A solution of 23.1 g. of 3,4,5-trimethoxybenzoyl chloride in 100 cc. of benzene is added to 20 g. of 2-methylpiperidine in 150 cc. of benzene. The resulting mixture is refluxed for 30 minutes. The reaction mixture is then washed twice with 100 cc. quantities of water, and the benzene is removed by evaporation in vacuo. The residue is dissolved in 100 cc. of dry ether, and the ether solution is added dropwise with stirring to a solution of 3.8 g. of lithium aluminum hydride in 150 cc. of ether. The reaction mixture is then refluxed for 1 hour, and 25 cc. of water are then added. The ether solution is decanted and washed with three 100 cc. portions of 5 percent hydrochloric acid. The combined acid extracts are made basic with 10 percent sodium hydroxide solution, whereupon an oil comprising 1-(3,4,5-trimethoxybenzyl)-2-methylpiperidine base separates. The oily base is removed, dissolved in ether, and the ether solution washed with water and dried over anhydrous magnesium sulfate. The ether is removed in vacuo and the residue is fractionally distilled under reduced pressure.

1-(3,4,5-trimethoxybenzyl) - 2 - methylpiperidine base thus prepared boiled at 144–146° C. at .25 mm. The refractive index was $n_D^{28°}$ 1.5269. Analsyis showed the presence of 5.06 percent of nitrogen as compared with the calculated amount of 5.01 percent.

EXAMPLE 6

*Preparation of 1-(3,4-dimethoxybenzyl)-2-methylpiperidine*

1-(3,4-dimethoxybenzyl)-2-methylpiperidine is prepared according to the method set forth in Example 5, except that 10 g. of 3,4-dimethoxybenzoyl chloride and 10 g. of 2-methylpiperidine are used.

1-(3,4-dimethoxybenzyl)-2 - methylpiperidine base thus prepared boiled at 141–143° C. at 0.6 mm. of mercury. The refractive index was $n_D^{26.5°}$ 1.5308. Analysis showed the presence of 5.65 percent of nitrogen as compared with the calculated amount of 5.62 percent.

The hydrochloride salt of 1-(3,4-dimethoxybenzyl)-2-methylpiperidine is prepared by the method employed in Example 2, using anhydrous hydrogen chloride gas. The salt melts at about 167–169° C.

EXAMPLE 7

*Preparation of 1-(3,5-dimethyl-2-methoxybenzyl)-2-methylpiperidine*

A mixture of 43 g. of 2-bromo-4,6-dimethylanisole, 6.1 g. of magnesium, 7.8 g. of ethyl iodide and 150 cc. of dry ether is refluxed for about 16 hours until formation of the Grignard reagent is complete. A solution of 39.2 g. of 2-methylpiperidinomethyl ethyl ether in 100 cc. of anhydrous ether is slowly added, and the reaction mixture is refluxed for 1 hour. The resulting solution containing crude 1-(3,5-dimethyl-2-methoxybenzyl)-2-methylpiperidine is then poured over 100 g. of a mixture of ice and hydrochloric acid. The acid water solution is separated from the ether layer and made basic with 10 percent ammonium hydroxide solution, whereupon an oil comprising 1-(3,5-dimethyl-2-methoxybenzyl - 2 - methylpiperidine base separates. The oil is removed from the reaction mixture, dissolved in ether, and the ether solution is washed with water and dried over anhydrous magnesium sulfate. The ether is evaporated off in vacuo and the residue is fractionally distilled to recover the base.

1-(3,5-dimethyl-2-methoxybenzyl) - 2-methylpiperidine base thus prepared boiled at 138–140° C. at 1.2 mm. The refractive index was $n_D^{25°}$ 1.5201. Analysis showed the presence of 5.77 percent of nitrogen as compared with the calculated amount of 5.66 percent.

2-methylpiperidinomethyl ethyl ether (B. P. 85–95° C./20 mm. Hg; $n_D^{25°}$ 1.4445) is obtained by adding over a period of one hour a solution of 2-methylpiperidine in alcohol to a refluxing mixture of trioxymethylene, ethanol, and benzene, and distilling off the ternary mixture of water, alcohol, and benzene. The solvents are removed by evaporation and the residue of 2-methylpiperidinomethyl ethyl ether is purified by vacuum distillation.

EXAMPLE 8

*Preparation of 1-(2-isoamyloxy-5-methylbenzyl)-2-methylpiperidine*

1-(2-isoamyloxy-5-methylbenzyl) - 2-methylpiperidine is prepared according to the method set forth in Example 1, except that 22.7 g. of 2-isoamyloxy-5-methylbenzyl chloride and 19.8 g. of 2-methylpiperidine and 150 cc. of benzene are used.

1-(2-isoamyloxy-5-methylbenzyl) - 2-methylpiperidine thus prepared boiled at 155–157° C. at 0.8 mm. The refractive index was $n_D^{25°}$ 1.5085. Analysis showed the presence of 4.83 percent of nitrogen as compared with the calculated amount of 4.68 percent.

2-isoamyloxy-5-methylbenzyl chloride (B. P. 108–110° C./.45 mm. Hg) is obtained by the above-mentioned chloromethylation procedure, using p-cresylisoamyl ether.

EXAMPLE 9

*Preparation of 1-(2-hydroxy-5-methylbenzyl)-2-methylpiperidine*

A cold mixture of 99 g. of 2-methylpiperidine, 30 g. of paraformaldehyde, and 200 cc. of ethanol is added to a cold solution of 108 g. of p-cresol in 100 cc. of ethanol. The reaction mixture is allowed to stand at room temperature for about one hour, and is then refluxed for 2 hours. The ethanol is distilled off in vacuo and the residue, comprising 1-(2-hydroxy - 5 - methylbenzyl) - 2-methylpiperidine base, is purified by fractional distillation under reduced pressure.

1-(2-hydroxy-5-methylbenzyl) - 2 - methylpiperidine base thus prepared boiled at 122–124° C. at 0.4 mm. The refractive index was $n_D^{25°}$ 1.5295. Analysis showed the presence of 6.61 percent nitrogen as compared with the calculated quantity of 6.39 percent.

1-(2-hydroxy-5-methylbenzyl) - 2 - methylpiperidine hydrochloride, prepared according to the procedure described in Example 2, melted with decomposition at about 163–164° C.

EXAMPLE 10

*Preparation of 1-(2-methoxy-5-methylbenzyl)-2-methylpiperidine hydrochloride*

A solution of 27.5 g. of 1-(2-methoxy-5-methylbenzyl)-2-methylpiperidine base in 200 cc. of anhydrous ether is treated with anhydrous hydrogen chloride until precipitation is complete. The hydrochloride salt is filtered, washed with ether and recrystallized from anhydrous methanol by the addition of ether.

1 - (2 - methoxy-5-methylbenzyl)-2-methylpiperidine hydrochloride thus prepared melted at 151–153° C., and analysis showed the presence of 13.25 percent of chlorine as compared with the calculated amount of 13.14 percent.

EXAMPLE 11

*Preparation of 1-(2-ethoxy-5-methylbenzyl)-2-methylpiperidine*

1 - (2-ethoxy-5-methylbenzyl)-2-methylpiperidine is prepare according to the procedure of Example 1, except that 18.5 g. of 2-ethoxy-5-methylbenzyl chloride, 20 g. of 2-methylpiperidine, and 100 cc. of benzene are used.

1 - (2-ethoxy-5-methylbenzyl)-2-methylpiperidine thus prepared boiled at 139–140° C. at 1.6 mm. The refractive index was $n_D^{25°}$ 1.5182. Analysis showed the presence of 5.72 percent nitrogen, as compared with the calculated amount of 5.66 percent.

2-ethoxy-5-methylbenzyl chloride (B. P. 86–87° C./.8 mm. Hg) is obtained by the above-mentioned procedure.

EXAMPLE 12

*Preparation of 1-(2-ethoxy-5-methylbenzyl)-2-methylpiperidine hydrochloride*

1 - (2-ethoxy-5-methylbenzyl)-2-methylpiperidine hydrochloride is prepared according to the method of Example 10.

1 - (2-ethoxy-5-methylbenzyl)-2-methylpiperidine hydrochloride thus prepared melted at 178–180° C. Analysis showed the presence of 4.80 percent of nitrogen and 12.43 percent of chlorine as compared with the calculated amounts of 4.94 percent of nitrogen and 12.49 percent of chlorine.

EXAMPLE 13

*Preparation of 1-(2-methoxy-5-t-butylbenzyl)-2-methylpiperidine*

1 - (2 - methoxy-5-t-butylbenzyl)-2-methylpiperidine is prepared according to the method set forth in Example 1, except that 21.3 g. of 5-t-butyl-2-methoxybenzyl chloride, 25 cc. of 2-methylpiperidine, and 100 cc. of toluene are used.

1 - (2 - methoxy-5-t-butylbenzyl)-2-methylpiperidine thus prepared boiled at 132–133° C. at 0.45 mm. The refractive index was $n_D^{25°}$ 1.5135. Analysis showed the presence of 4.94 percent nitrogen as compared with the calculated quantity of 4.87 percent.

2-methoxy-5-t-butylbenzyl chloride (B. P. 94–96° C./.2 mm. Hg) is prepared by the above-mentioned chloromethylation procedure, using p-t-butylanisole.

EXAMPLE 14

*Preparation of 1-(2-hydroxy-3,5-dimethylbenzyl)-2-methylpiperidine*

1 - (2 - hydroxy-3,5-dimethylbenzyl)-2-methylpiperidine is prepared according to the method of Example 9, except that 82 g. of 2-methylpiperdine, 24.6 g. of paraformaldehyde, 100 g. of 4-hydroxy-1,3-dimethylbenzene, and 200 cc. of ethanol are used.

1 - (2 - hydroxy-3,5-dimethylbenzyl)-2-methylpiperidine thus prepared boiled at 120–122° C. at 0.35 mm. The refractive index was $n_D^{25°}$ 1.5302. Analysis showed the presence of 6.08 percent nitrogen, as compared with the calculated amount of 6.00 percent.

The hydrochloride of 1-(2-hydroxy-3,5-dimethylbenzyl)-2-methylpiperidine, prepared according to the method of Example 10, melted at 176–177° C. Analysis showed the presence of 5.29 percent of nitrogen and 13.41 percent of chlorine, as compared with the calculated quantities of 5.19 percent of nitrogen and 13.14 percent of chlorine.

EXAMPLE 15

*Preparation of 1-(2-n-butoxy-5-methylbenzyl)-2-methylpiperidine*

1 - (2 - n-butoxy-5-methylbenzyl)-2-methylpiperidine is prepared according to the method of Example 1, except that 21.3 g. of 2-n-butoxy-5-methylbenzyl chloride, 20 g. of 2-methylpiperidine, and 125 cc. of toluene are employed.

1 - (2 - n-butoxy-5-methylbenzyl)-2-methylpiperidine thus prepared boiled at 136–137° C. at 0.6 mm. The refractive index was $n_D^{25°}$ 1.5118.

Analysis showed the presence of 4.91 percent of nitrogen as compared with the calculated quantity of 5.09 percent.

2-n-butoxy-5-methylbenzyl chloride (B. P. 104–107° C./.6 mm. Hg) is prepared by the above-mentioned chloromethylation procedure, using p-cresyl n-butyl ether.

EXAMPLE 16

*Preparation of 1-(2-ethylmercapto-5-methylbenzyl)-2-methylpiperidine*

1 - (2-ethylmercapto-5-methylbenzyl)-2-methylpiperidine is prepared according to the method of Example 1, except that 21.5 g. of 2-ethylmercapto-5-methylbenzyl chloride, 20 g. of 2-methylpiperidine and 150 cc. of benzene are used.

1 - (2-ethylmercapto-5-methylbenzyl)-2-methylpiperidine thus prepared boiled at 131–132° C. at 0.28 mm. The refractive index was $n_D^{25°}$ 1.5528. Analysis showed the presence of 12.36 percent of sulfur and 5.31 percent of nitrogen as compared with the calculated amounts of 12.17 percent of sulfur and 5.32 percent of nitrogen.

2-ethylmercapto-5-methylbenzyl chloride (B. P. 95–97° C./.2 mm Hg) is prepared by the above-mentioned chloromethylation procedure, using p-cresyl ethyl sulfide.

EXAMPLE 17

*Preparation of 1-(2-n-heptyloxy-5-methylbenzyl)-2-methylpiperidine*

1 - (2-n-heptyloxy-5-methylbenzyl)-2-methylpiperidine is prepared according to the method set out in Example 1, except that 25.5 g. of 2-n-heptyloxy-5-methylbenzyl chloride, 19.8 g. of 2-methylpiperidine, and 200 cc. of benzene are used.

1 - (2-n-heptyloxy-5-methylbenzyl)-2-methylpiperidine thus prepared boiled at 160–162° C. at 2.2 mm. The refractive index was $n_D^{25°}$ 1.5052. Analysis showed the presence of 4.54 percent of nitrogen, 79.76 percent of carbon and 11.40 percent of hydrogen, compared with the calculated amounts of 4.41 percent of nitrogen, 79.44 percent of carbon and 11.11 percent of hydrogen.

2-n-heptyloxy-5-methylbenzyl chloride (B. P. 135–137° C./.45 mm. Hg) is prepared by the above-mentioned chloromethylation procedure, using p-cresyl n-heptyl ether.

The hydrochloride of 1 - (2-n-heptyloxy-5-methylbenzyl)-2-methylpiperidine was prepared according to the method of Example 10 and melted at 112–114° C. Analysis showed the presence of 9.96 percent of chlorine and 3.89 percent of nitrogen as compared with the calculated amounts of 10.02 percent of chlorine and 3.96 percent of nitrogen.

EXAMPLE 18

*Preparation of 1-(3-methoxybenzyl)-2,6-dimethylpiperidine*

1-(3-methoxybenzyl)-2,6-dimethylpiperidine is prepared according to the method of Example 5, except that 27 g. of 3-methoxybenzoyl chloride, 45.2 g. of 2,6-dimethylpiperidine, 150 cc. of benzene, and 7.6 g. of lithium aluminum hydride are used.

1 - (3-methoxybenzyl)-2,6-dimethylpiperidine thus prepared boiled at 117–119° C. at 0.6 mm. The refractive index was $n_D^{25°}$ 1.5235. Analysis showed the presence of 6.20 percent of nitrogen as compared with the calculated amount of 6.00 percent.

EXAMPLE 19

*Preparation of 1-(2-methoxy-5-methylbenzyl)-3-methylpiperidine*

1 - (2 - methoxy-5-methylbenzyl)-3-methylpiperidine is prepared according to the method of Example 1, except that 25 g. of 2-methoxy-5-methylbenzyl chloride, 35 g. of 3-methylpiperidine and 100 cc. of toluene are used.

1 - (2 - methoxy-5-methylbenzyl)-3-methylpiperidine thus prepared boiled at 112–115° C. at 0.6 mm. The refractive index was $n_D^{25°}$ 1.5217. Analysis showed the presence of 5.88 percent of nitrogen as compared with the calculated amount of 6.01 percent of nitrogen.

EXAMPLE 20

*Preparation of 1-(2-methoxy-5-methylbenzyl)-2,4-dimethylpiperidine*

1 - (2-methoxy-5-methylbenzyl)-2,4-dimethylpiperidine is prepared according to Example 1, except that 17 g. of 2,4-dimethylpiperidine, 200 g. of toluene and 3.5 g. of sodium hydride are used. 25 g. of 2-methoxybenzyl chloride are then added, and the mixture is refluxed.

1 - (2-methoxy-5-methylbenzyl)-2,4-dimethylpiperidine thus prepared boiled at 105–107° C. at 0.5 mm. The refractive index was $n_D^{25°}$ 1.5184. Analysis showed the presence of 5.66 percent of nitrogen as compared with the theoretical amount of 5.66 percent of nitrogen.

EXAMPLE 21

*Preparation of 1-(2-methoxy-5-methylbenzyl)-2-ethylpiperidine*

1 - (2-methoxy-5-methylbenzyl)-2-ethylpiperidine was prepared by the method of Example 1, except that a mixture of 25 g. of 2-methoxy-5-methylbenzyl chloride, 17 g. of 2-ethylpiperidine, 20 g. of potassium carbonate, 100 cc. of methyl "Cellosolve" (ethylene glycol monomethyl ether), and 5 cc. of water was refluxed.

1 - (2-methoxy-5-methylbenzyl)-2-ethylpiperidine thus prepared boiled at 112–118° C. at 0.5 mm. The refractive index was $n_D^{25°}$ 1.5247. Analysis showed the presence of 5.63 percent of nitrogen as compared with the calculated amount of 5.66 percent.

EXAMPLE 22

*Preparation of 1-(2-methoxy-5-methylbenzyl)-2-n-amylpiperidine*

1 - (2-methoxy-5-methylbenzyl)-2-n-amylpiperidine is prepared according to the method of Example 1 except that a mixture of 23.5 g. of 2-n-amylpiperidine, 20 g. of potassium carbonate, 25 g. of 2-methoxy-5-methylbenzyl chloride, 100 cc. of methyl "Cellosolve" and 5 cc. of water is refluxed.

1 - (2-methoxy-5-methylbenzyl)-2-n-amylpiperidine thus prepared boiled at 138–144° C. at 0.8 mm. The refractive index was $n_D^{25°}$ 1.5140. Analysis showed the presence of 4.98 percent of nitrogen as compared with the theoretical amount of 4.85 percent.

EXAMPLE 23

*Preparation of 1-(2-methoxy-5-methylbenzyl)-2,6-dimethylpiperidine*

1 - (2-methoxy-5-methylbenzyl)-2,6-dimethylpiperidine is prepared according to the method of Example 5, except that 10 g. of 2-methoxy-5-methylbenzoyl chloride, 6.1 g. of 2,6-dimethylpiperidine, 100 cc. of piperidine and 0.76 g. of lithium aluminum are used.

1 - (2-methoxy-5-methylbenzyl) -2,6-dimethylpiperidine thus prepared boiled at 170–175° C. at 0.6 mm. The refractive index was $n_D^{25°}$ 1.5241.

EXAMPLE 24

*Preparation of 1 - (2-methoxy-5-methylbenzyl) - 2,6-dimethylpiperidine sesquioxalate*

1 - (2-methoxy-5-methylbenzyl) -2,6-dimethylpiperidine sesquioxalate is prepared by treating a solution of 2.47 g. of 1-(2-methoxy-5-methylbenzyl) -2,6-dimethylpiperidine in 50 cc. of ether with a solution of 1.35 g. of oxalic acid in 100 cc. of ether. Crystals of 1-(2-methoxy-5-methylbenzyl) -2,6-dimethylpiperidine sesquioxalate separate and are collected by filtration.

1 - (2-methoxy-5-methylbenzyl) -2,6-dimethylpiperidine sesquioxalate thus prepared melted at 114–115° C. Analysis showed the presence of 59.97 percent of carbon, 7.29 percent of hydrogen, and 3.88 percent of nitrogen as compared with the calculated amounts of 59.67 percent of carbon, 7.38 percent of hydrogen and 3.66 percent of nitrogen.

EXAMPLE 25

*Preparation of 1 - (2 - ethoxy-3-ethyl-5-methylbenzyl) -2-methylpiperidine*

To a solution of 19.7 g. of 2-ethyl-4-methylphenetole in 50 cc. of anhydrous ether is added a solution of 8.16 g. of n-butyllithium in 120 cc. of ether, with stirring. The mixture is refluxed for 8 hours, and 23.6 g. of 2-methylpiperidinomethyl ethyl ether are added. The mixture is stirred and refluxed for 2 hours, and is then cooled, and hydrolyzed by the addition of 120 cc. of 10 percent sulfuric acid. The ether layer is extracted with three 25 cc. portions of 20 percent sulfuric acid. The acid extracts are combined, 12 g. of ammonium chloride are added, and 10 percent ammonium hydroxide solution is then added until the mixture has a basic pH. The basic mixture is extracted with three 50 cc. portions of ether, and the combined ether extracts, containing 1 - (2 - ethoxy - 3 - ethyl-5-methylbenzyl) -2-methylpiperidine are dried over magnesium sulfate and fractionally distilled.

1 - (2 - ethoxy - 3 - ethyl-5-methylbenzyl) -2-methylpiperidine thus prepared boiled at 136–138° C. at 1.25 mm. The refractive index was $n_D^{25°}$ 1.5110. Analysis showed the presence of 5.11 percent of nitrogen as compared with the theoretical amount of 5.08 percent of nitrogen.

2-ethyl-4-methylphenetole was prepared by the catalytic hydrogenation of 2 - aceto - 4 - methylphenetole with copper chromite catalyst and hydrogen, using a pressure of about 100 atmospheres and a temperature of about 200° C. 2-ethyl-4-methylphenetole boils at about 73–74° C. at a pressure of about 3.5 mm. of mercury.

EXAMPLE 26

*Preparation of 1 -(3-methyl-4-methoxybenzyl) - 2-methylpiperidine*

1 - (3 - methyl - 4-methoxybenzyl) -2-methylpiperidine is prepared according to the method of Example 1, except that 108.7 g. of 3-methyl-4-methoxybenzyl chloride, 126 g. of 2-methylpiperidine and 400 cc. of benzene are used.

1 - (3 - methyl - 4-methoxybenzyl) -2-methylpiperidine thus prepared boiled at 117° C. at 0.8 mm. The refractive index was $n_D^{25°}$ 1.5266. Analysis showed the presence of 77.0 percent of carbon, 10.0 percent of hydrogen and 5.98 percent of nitrogen, compared with the theoretical amounts of 77.3 percent of carbon, 9.97 percent of hydrogen and 6.01 percent of nitrogen.

EXAMPLE 27

*Preparation of 1 - (3-methyl-4-hydroxybenzyl) - 2-methylpiperidine*

A solution of 101 g. of 1-(3-methyl-4-methoxybenzyl) -2-methylpiperidine prepared in accordance with the procedure of Example 26, is dissolved in 300 g. of 48 percent hydrobromic acid and the solution is saturated with hydrogen bromide gas. The reaction is heated cautiously to refluxing temperature and refluxed for about 2 hours. The mixture is cooled and made basic with ammonium hydroxide, whereupon 1 - (3-methyl - 4 - hydroxybenzyl) - 2-methylpiperidine base separates. The base is purified by recrystallizing it from a mixture of benzene and petroleum ether.

1 - (3 - methyl - 4 - hydroxybenzyl) -2-methylpiperidine thus prepared melted at about 125–127° C. Analysis showed the presence of 6.62 percent nitrogen as compared with the calculated value of 6.39 percent.

1 - (3 - methyl - 4 - hydroxybenzyl) -2-methylpiperidine hydrochloride is obtained by acidifying an ethanol solution of 1-(3-methyl-4-hydroxybenzyl) - 2 - methylpiperidine by passing in dry hydrogen chloride gas, and adding ether to the reaction mixture to precipitate the hydrochloride salt. 1-(3-methyl-4-hydroxybenzyl) -2-methylpiperidine hydrochloride melts at about 183–185° C.

EXAMPLE 28

*Preparaion of 1-(3-methoxybenzyl) -2-methylpiperidine*

1-(3-methoxybenzyl) - 2 - methylpiperidine is prepared according to the method of Example 5, except that 34.1 g. of 3-methoxybenzoyl chloride, 40 g. of 2-methylpiperidine, 150 cc. of benzene and 7.6 g. of lithium aluminum hydride are used.

1-(3-methoxybenzyl) -2-methylpiperidine thus prepared boiled at 122–124° C. at 1.0 mm. The refractive index was $n_D^{25°}$ 1.5246. Analysis showed the presence of 6.45 percent of nitrogen as compared with the calculated amount of 6.39 percent.

1-(3-methoxybenzyl) -2-methylpiperidine hydrochloride, prepared according to the method of Example 10, melted at 170–172° C. Analysis showed the presence of 5.55 percent of nitrogen and 13.77 percent of chlorine, compared with the calculated amounts of 5.48 percent of nitrogen and 13.86 percent of chlorine.

EXAMPLE 29

Additional examples of compounds illustrating this invention and which are prepared by the methods set out in the preceding examples include the following:

1-(2-hydroxy-4,5-dimethylbenzyl) -2- methyl - piperidine B. P. 125° C. at 0.25 mm., $n_D^{25°}$ 1.5320; 1 - (5 - t - butyl - 2-hydroxybenzyl) -2-methylpiperidine B. P. 136–139° C. at 0.35 mm., $n_D^{25°}$ 1.5210; 1 - (2,3 - dimethoxybenzyl) - 2-methylpiperidine B. P. 124–126° C. at 0.6 mm., $n_D^{25°}$ 1.5246; 1-(3,5-dimethoxybenzyl) -2-methylpiperidine hydrochloride M. P. 182–184° C.; 1-(2-methoxy-3-methylbenzyl) -2-methylpiperidine hydrochloride M. P. 203–204° C.; 1-(2,4-dimethyl-6-methoxybenzl) - 2-methylpiperidine hydrochloride M. P. 200–201°

C.; 1-(3-n-amyl-2-ethoxybenzyl) - 2 - methylpiperidine hydrochloride M. P. 186–188° C.; 1-(2-isobutoxy-5-methylbenzyl)-2-methylpiperidine hydrochloride M. P. 177–179° C.; (2,5-dimethoxybenzyl)-2-methylpiperidine hydrochloride M. P. 138–139° C.; 1-(3-hydroxy-4-methylbenzyl)-2-methylpiperidine hydrochloride M. P. 118–121° C.; 1-(3-hydroxybenzyl)-2-methylpiperidine hydrochloride M. P. 148–150° C.; 1-(5-ethyl-2-methoxybenzyl) - 2 - methylpiperidine hydrobromide M. P. 114–117° C.; 1-(2-allyloxy-5-methylbenzyl) -2- methylpiperidine hydrochloride M. P. 182–184° C.; 1-(3-methyl-4-n-butoxybenzyl)-2-methylpiperidine hydrochloride M. P. 134–136° C.; 1-(4-ethoxy-3-methoxybenzyl)-2-methylpiperidine hydrochloride M. P. 193–194° C.; 1-(4-n-butoxy -3- methoxybenzyl) - 2 - methylpiperidine hydrochloride M. P. 145–146° C.; 1-(2-methoxy-5-methylbenzyl)-4-methylpiperidine B. P. 105° C. at 0.3 mm., $n_D^{25°}$ 1.5211; and 1-(2-methoxy-5-methylbenzyl) -2,3-dimethylpiperidine B. P. 107–108° C. at 0.3 mm., $n_D^{25°}$ 1.5220.

I claim:
1. A compound of the class consisting of a base and its acid addition salts, the said base having the formula:

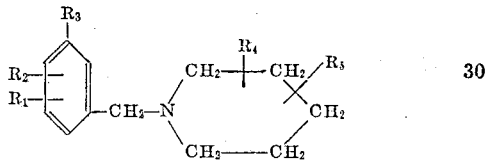

in which $R_1$ and $R_2$ are members of the group consisting of hydrogen, hydroxy, unsubstituted aliphatic hydrocarbon radicals having from 1 to 8 carbon atoms, oxygen-linked unsubstituted aliphatic hydrocarbon radicals having from 1 to 8 carbon atoms, and sulfur-linked unsubstituted aliphatic hydrocarbon radicals having from 1 to 8 carbon atoms; $R_3$ is a member of the group consisting of hydroxy, unsubstituted aliphatic hydrocarbon radicals having from 1 to 8 carbon atoms, oxygen-linked unsubstituted aliphatic hydrocarbon radicals having from 1 to 8 carbon atoms, and sulfur-linked unsubstituted aliphatic hydrocarbon radicals having from 1 to 8 carbon atoms; $R_4$ is a lower alkyl radical; and $R_6$ is a member of the group consisting of hydrogen and lower alkyl radicals.

2. 1-(2-ethylmercapto - 5 - methylbenzyl) - 2 - methylpiperidine.

3. 1-(2-hydroxy-3,5-dimethylbenzyl) -2-methylpiperidine.

4. 1-(2-methylmercapto - 5 - methylbenzyl) -2-methylpiperidine.

5. 1 - (2-n-propoxy-5-methylbenzyl) - 2 -methylpiperidine.

6. 1-(2-hydroxy-5-methylbenzyl) - 2 - methylpiperidine.

7. A compound represented by the formula

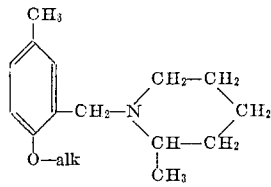

wherein alk is an alkyl radical having from 1 to 8 carbon atoms.

8. A compound represented by the formula

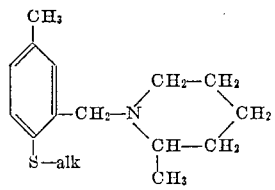

wherein alk is an alkyl radical having from 1 to 8 carbon atoms.

ALBERT POHLAND.

REFERENCES CITED

The following references are of record in the file of this patent:

UNITED STATES PATENTS

| Number | Name | Date |
| --- | --- | --- |
| 2,108,147 | Speer | Feb. 15, 1938 |
| 2,152,047 | Hahl et al. | Mar. 28, 1939 |
| 2,200,603 | Hentrich | May 14, 1940 |
| 2,220,834 | Bruson et al. | Nov. 5, 1940 |
| 2,441,069 | Hoffman et al. | May 4, 1948 |
| 2,474,820 | Burckhalter et al. | July 5, 1949 |
| 2,498,431 | Lee | Feb. 21, 1950 |

OTHER REFERENCES

Yang: J. Org. Chem., vol. 10, (1945), p. 6788.
Tseou et al.: Chem. Abs., vol. 33, (1939), p. 5851.
Fellows: Chem. Abs., vol. 37, (1943), p. 4472[5].